3,836,650
METHOD FOR COMBATING MAREK'S DISEASE IN POULTRY

Joseph Bernard Schleicher, Lake Bluff, and William Rodney Roderick, Libertyville, Ill., assignors to Abbott Laboratories, Chicago, Ill.
No Drawing. Continuation-in-part of application Ser. No. 119,056, Feb. 25, 1971, now Patent No. 3,767,795. This application June 8, 1973, Ser. No. 366,933
Int. Cl. A61k 27/00
U.S. Cl. 424—212
4 Claims

ABSTRACT OF THE DISCLOSURE

A method of preventing or treating Marek's disease in poultry by administering phosphonoacetic acid or its salts.

---

This application is a continuation-in-part of U.S. application Ser. No. 119,056 filed Feb. 25, 1971, now U.S. Pat. 3,767,795 issued Oct. 23, 1973.

Background of the Invention

Marek's disease is caused by a herpes like virus and is part of the avian leukosis complex. This group of diseases is the greatest cause of economic loss in the U.S. poultry industry. Marek's disease is primarily a disease of younger chickens from two to five months of age, although younger or older birds can be affected. Paralysis of both legs or wings is commonly observed due to tumors of nerves leading to affected parts. Other parts may be affected, particularly the visceral organs, the gonads or the eye. In the ocular form of the disease the iris becomes gray and is often distorted in shape. In severe cases, the bird becomes blind. The disease spreads rapidly by contact from infected to un-infected birds, and young chicks are much more susceptible than older birds. Airborn infection is of significance. Normal appearing birds may have mild lesions of the disease and it is quite possible that such birds are carriers of the infection. The infective agent occurs in blood cells, lymphoid tumor cells, plasma and feather follicles from affected birds. Day-old chicks infected with a suspension of tumor cells from an infected bird show signs of the disease in a few weeks. Many infected chicks will die by the time they are eight weeks of age. There is no effective treatment of the disease nor any foolproof preventive measures that can be taken. Losses can generally be minimized by good hygiene and flock management. For example, isolating young stock from old hens during the rearing period to minimize exposure to the virus. Strains of chickens have been developed that show genetic resistance to Marek's disease and some control can be achieved by eliminating families that show a high incidence of the disease. A vaccine has also been shown to be effecacious in reducing the paralysis associated with this disease.

Summary of the Invention

The invention relates to a method of preventing or treating Marek's disease in poultry comprising administrating to poultry phosphonoacetic acid and its salts. The structure of phosphonoacetic acid being as follows.

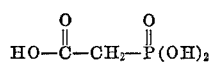

The compounds are administered either as the acid or as the alkali metal salts particularly the mono, di, or trisodium salt or the calcium salt.

Detailed Description

One-day-old chicks were prophylactically treated with disodium phosphonoacetic acid or a dosage level of 500 milligrams per kilogram per day, orally for 7 days, at which time they were infected intra-abdominally with Marek's virus; half with 1500 units per bird and the other half with 6000 units per bird. The birds were then treated for an additional fourteen days and observed daily for paralysis and death. The results are summarized in the following tables.

Additionally, disodium phosphonoacetic acid is active against Marek's disease virus in tissue culture at 100 micrograms per milliliter ($\mu$g./ml.).

TABLE 1.—TOTAL NUMBER OF CHICKS PARALYZED

| Group | Marek's disease, virus units/ bird | Medication | Number of chicks |||
|---|---|---|---|---|---|
| | | | | Paralysis ||
| | | | Initial | Number | Percent |
| A | 1,500 | Disodium phosphonoacetic acid. | 24 | 2 | 8 |
| B | 1,500 | None | 25 | 6 | 36 |
| C | 6,000 | Disodium phosphonoacetic acid. | 25 | 2 | 8 |
| D | 6,000 | None | 25 | 9 | 36 |
| E | None | do | 29 | 0 | 0 |

TABLE 2.—RATE OF PARALYSIS OF CHICKS

| Post-infection day | Group | Marek's disease, virus units/ bird | Medication | Paralysis (No. of chicks) |
|---|---|---|---|---|
| 22 | B | 1,500 | None | 1 |
| 22 | D | 6,000 | do | 1 |
| 26 | D | 6,000 | do | 4 |
| 27 | A | 1,500 | Disodium phosphonoacetic acid. | 1 |
| 29 | B | 1,500 | None | 2 |
| 29 | D | 6,000 | do | 1 |
| 30 | B | 1,500 | do | 1 |
| 32 | B | 1,500 | do | 1 |
| 32 | D | 6,000 | do | 2 |
| 32 | C | 6,000 | Disodium phosphonoacetic acid. | 1 |
| 34 | A | 1,500 | Disodium phosphonoacetic acid. | 1 |
| 34 | D | 6,000 | None | 1 |
| 41 | B | 1,500 | do | 1 |
| 41 | C | 6,000 | Disodium phosphonoacetic acid. | 1 |

It is apparent from the results that treatment of chicks orally with 500 mg. per kg. per day of disodium phosphonoacetic acid for twenty-one days resulted in no toxicity. The incidence of paralysis in non-treated chicks was found to be about four times as great as in treated birds, indicating that the compound had a significant effect on the proliferation of Marek's virus. From Table 2 it is apparent that the first sign of paralysis in a treated bird occurred twenty-seven days after infection whereas the first paralyzed bird in the non-treated group occurred twenty-two days after infection, indicating that the compounds had a suppressive effect on Marek's virus.

One day old chicks were prophylactically treated with disodium phosphonoacetic acid at a dosage level of 500 mg. per kg. per day, orally for seven days at which time they were infected with Marek's virus "JM" strain at a dose of 2,000 plaque forming units per bird via intra-abdominal injection. The birds were then treated for an additional 2, 5 or 8 weeks. The results are summarized in the following table.

TABLE 3.—THE EFFECT OF DISODIUM PHOSPHONOACETIC ACID ON CHICKS INFECTED WITH THE "JM" STRAIN OF MAREK'S DISEASE VIRUS

Birds sacrificed when severely paralyzed

| Group | Week 0 | 1 | 2 | 3 | 4 | 5 | 6 | 7 | 8 | 9 | Accumulated totals [a] | Survivors: gross tumors found at autopsy |
|---|---|---|---|---|---|---|---|---|---|---|---|---|
| Normal control | 0/27 | 2/27 | 0/27 | 0/27 | 0/27 | 0/27 | 0/27 | 0/27 | 0/27 | 0/27 | 0/25  0% | 0/25 |
| Virus control | 0/27 | 1/27 | 0/27 | 0/27 | 0/27 | 0/27 | 2/27 | 2/27 | 5/27 | 2/27 | 11/26  42% | 0/15 |
| Drug control: | | | | | | | | | | | | |
| 500 mg/kg/day, 3 weeks | 0/11 | 0/11 | 0/11 | 0/11 | 0/11 | 0/11 | 0/11 | 0/11 | 0/11 | 0/11 | 0/11  0% | 0/11 |
| 500 mg/kg/day, 6 weeks | 0/11 | 0/11 | 0/11 | 1/11 | 2/11 | 0/11 | 0/11 | 0/11 | 0/11 | 0/11 | [b] 3/11  27% | 0/8 |
| 500 mg/kg/day, 9 weeks | 0/11 | 0/11 | 0/11 | 0/11 | 0/11 | 0/11 | 0/11 | 0/11 | 0/11 | 2/11 | [b] 2/11  18% | 0/9 |
| Virus and drug: | | | | | | | | | | | | |
| 500 mg/kg/day, 3 weeks | 0/27 | 2/27 | 0/27 | 0/27 | 2/27 | 0/27 | 0/27 | 0/27 | 1/27 | 0/27 | [b] 3/25  12% | 0/22 |
| 500 mg/kg/day, 6 weeks | 0/27 | 2/27 | 0/27 | 1/27 | 4/27 | 2/27 | 0/27 | 0/27 | 0/27 | 0/27 | [b] 7/25  28% | 0/18 |
| 500 mg/kg/day, 9 weeks | 0/27 | 0/27 | 0/27 | 0/27 | 1/27 | 0/27 | 0/27 | 2/27 | 2/27 | 2/27 | 7/27  26% | 1/20 |

[a] A total of 7 chicks in this experiment died before they were infected with the virus. These dead birds were not scored in "Accumulated Totals."

[b] Some degree of drug toxicity occurred in chicks that were medicated for 6 and 9 weeks.

NOTE:
Normal control: No virus, no drug.
Virus control: Virus, no drug.
Drug control: Drug only.
Medication: Disodium phosphonoacetic acid, 500 mg./kg./day, oral, for: 3 weeks, 6 weeks, 9 weeks.
Infection: Marek's virus, "JM" strain, intra-abdominal injection, 2,000 p.f.u./bird.

From the table it can be seen that the (1) normal control chickens showed no paralysis, although two birds died from unexplained reasons, (2) no toxicity was observed in chicks that were treated with disodium phosphonoacetic acid at 500 mg. per kg. per day for three weeks. Medication for six weeks resulted in a mortality of 3/11 birds. Nine weeks of medication gave a mortality of 2/11 birds, and (3) the level of paralysis was lower in the treated groups of chicks. There was, however, no dose response within the groups.

Administration of disodium phosphonoacetic acid at a dosage level of 100 or 400 mg. per kg. per day for a period of nine weeks did not evidence any efficacy in reduction of paralysis. Administration of the compound for at least three weeks at a dosage level of 500 mg. per kg. per day is preferred. As is evident from the data, administration of the compound to the birds prior to infection aides in preventing Marek's disease, with administration for at least three weeks reducing the number of birds affected.

What is claimed is:

1. A method for treating Marek's virus infections in poultry which method comprises administering to poultry in need of said treatment an effective amount for combating said Marek's virus infection of phosphonoacetic acid or an alkali metal salt thereof.

2. A method as claimed in Claim 1 wherein the alkali metal salt is selected from the group consisting of the mono, di or trisodium salt.

3. A method as claimed in Claim 2 wherein the alkali metal salt is administered orally at a dosage of about 500 mg./kg. daily.

4. A method as claimed in Claim 3 wherein the alkali metal salt is administered for a period of at least three weeks.

References Cited

Stock et al., Cancer Research, vol. 20, No. 5, Part 2, pp. 193, 194 and 342 (June 1960).

Cancer Research, vol. 21, No. 8, Part 2, pp. 377, 378 and 451 (September 1961).

Cancer Research, vol. 24, No. 2, Part 2, pp. 211, 212, 227 and 378 (February 1964).

JEROME D. GOLDBERG, Primary Examiner